(12) United States Patent
Wu et al.

(10) Patent No.: US 11,144,033 B2
(45) Date of Patent: Oct. 12, 2021

(54) SYSTEM AND METHOD FOR INDUSTRIAL PLANT DESIGN COLLABORATION

(71) Applicant: General Electric Company, Schenectady, NY (US)

(72) Inventors: Yanyan Wu, Houston, TX (US); Michael Poole, Houston, TX (US); Cherine Foutch, Alpharetta, GA (US); Daniel Kessler, Houston, TX (US); William Masters, Houston, TX (US)

(73) Assignee: General Electric Company, Schenectady, NY (US)

(*) Notice: Subject to any disclaimer, the term of this patent is extended or adjusted under 35 U.S.C. 154(b) by 373 days.

(21) Appl. No.: 16/029,250

(22) Filed: Jul. 6, 2018

(65) Prior Publication Data
US 2019/0011901 A1  Jan. 10, 2019

Related U.S. Application Data

(60) Provisional application No. 62/529,868, filed on Jul. 7, 2017.

(51) Int. Cl.
*G05B 19/4097* (2006.01)
*G05B 19/4063* (2006.01)

(52) U.S. Cl.
CPC ..... *G05B 19/4097* (2013.01); *G05B 19/4063* (2013.01); *G05B 2219/31449* (2013.01)

(58) Field of Classification Search
CPC ............ G05B 19/4097; G05B 19/4063; G05B 2219/31449

USPC ............................................................ 703/1
See application file for complete search history.

(56) References Cited

U.S. PATENT DOCUMENTS

| | | | | |
|---|---|---|---|---|
| 2,915,831 A | * | 12/1959 | Parker | G09B 25/02 434/73 |
| 7,086,163 B1 | * | 8/2006 | Makotinsky | G01C 15/002 33/1 CC |
| 7,444,269 B2 | * | 10/2008 | Drumheller | G06F 30/18 703/1 |
| 9,851,712 B2 | * | 12/2017 | Kambe | G05B 19/418 |
| 10,433,708 B1 | * | 10/2019 | Yacyshyn | A61B 1/00029 |
| 2002/0129001 A1 | * | 9/2002 | Levkoff | G06F 30/13 |
| 2003/0074163 A1 | * | 4/2003 | Anand | G05B 15/02 703/1 |

(Continued)

OTHER PUBLICATIONS

Germani et al. ("Development of a collaborative product development tool for plants design", ICED, 2005, pp. 1-12) (Year: 2005).*

(Continued)

*Primary Examiner* — Iftekhar A Khan
(74) *Attorney, Agent, or Firm* — Fletcher Yoder P.C.

(57) ABSTRACT

A system includes a collaborative design system that includes a processor configured to display an industrial plant layout on a display. The processor is also configured to overlay the industrial plant layout onto a geographic image. Further, the processor is configured to receive one or more inputs from a plurality of remote users. In addition, the processor is configured to manipulate the layout with respect to the geographic image based on the one or more inputs. Moreover, the processor is configured to create an industrial plant design based on the industrial plant layout and the geographic image.

20 Claims, 4 Drawing Sheets

(56) References Cited

U.S. PATENT DOCUMENTS

| | | | | |
|---|---|---|---|---|
| 2005/0240289 A1* | 10/2005 | Hoyte | ................ | G05B 19/0426 700/49 |
| 2005/0251494 A1* | 11/2005 | Maria Jansen | ........ | G05B 17/02 |
| 2010/0318392 A1* | 12/2010 | Cassels | .............. | G06Q 10/0631 705/7.12 |
| 2011/0202469 A1* | 8/2011 | Venkateswaran | ...... | G06Q 10/06 705/301 |
| 2011/0313878 A1* | 12/2011 | Norman | ............. | G06Q 30/0621 705/26.5 |
| 2012/0095808 A1* | 4/2012 | Kattapuram | ..... | G05B 19/41885 705/7.37 |
| 2014/0129005 A1* | 5/2014 | Weatherhead | ...... | G06F 21/6227 700/86 |
| 2014/0163713 A1* | 6/2014 | Ross | ...................... | G06Q 10/04 700/108 |
| 2014/0365993 A1* | 12/2014 | Rath | ..................... | A63F 13/213 717/105 |
| 2015/0128104 A1* | 5/2015 | Rath | ....................... | A63F 13/60 717/105 |
| 2015/0261891 A1* | 9/2015 | Carlini | .................... | G06F 16/22 703/1 |
| 2016/0132037 A1* | 5/2016 | Weng | ................. | G05B 19/0426 700/87 |
| 2016/0132047 A1* | 5/2016 | Kambe | ............. | G05B 19/0426 700/87 |
| 2016/0132048 A1* | 5/2016 | Kambe | ................ | G05B 19/418 700/87 |

OTHER PUBLICATIONS

Filho et al. (An Automated Platform for Immersive and Collaborative Visualization of Industrial Models, 2002, IEEE, pp. 258-264) (Year: 2002).*

Prasad et al. (A Typical Manufacturing Plant Layout Design Using CRAFT Algorithm, Procedia Engineering 97 (2014) 1808-1814) (Year: 2014).*

Hou et al. ("Combining Photogrammetry and Augmented Reality Towards an Integrated Facility Management System for the Oil Industry", IEEE, 2014, pp. 204-220) (Year: 2014).*

* cited by examiner

SYSTEM AND METHOD FOR INDUSTRIAL PLANT DESIGN COLLABORATION

CROSS REFERENCE TO RELATED APPLICATIONS

This application claims priority from and the benefit of U.S. Provisional Application Ser. No. 62/529,868, entitled "SYSTEM AND METHOD FOR INDUSTRIAL PLANT DESIGN COLLABORATION," filed Jul. 7, 2017, which is hereby incorporated by reference in its entirety for all purposes.

BACKGROUND

The subject matter disclosed herein relates to a system and method for industrial plant design collaboration.

Certain design techniques may be used to create designs and/or models for industrial plants, such as power production plants. Industrial plants may include a wide variety of components spread over a large area to achieve a particular purpose, such as power generation, sewage treatment, hydrocarbon refinery, etc. It may be beneficial to improve the efficiency and quality of industrial plant designs.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a system includes a collaborative design system that includes a processor configured to display an industrial plant layout on a display. The processor is also configured to overlay the industrial plant layout onto a geographic image. Further, the processor is configured to receive one or more inputs from a plurality of remote users. In addition, the processor is configured to manipulate the layout with respect to the geographic image based on the one or more inputs. Moreover, the processor is configured to create an industrial plant design based on the industrial plant layout and the geographic image.

In another embodiment, a method includes displaying, via a processor, an industrial plant layout on a display, and overlaying, via the processor, the industrial plant layout onto a geographic image. The method further includes receiving, via the processor, one or more inputs from a plurality of remote users, and manipulating, via the processor, the layout with respect to the geographic image based on the one or more inputs. The method additionally includes creating, via the processor, an industrial plant design based on the industrial plant layout and the geographic image.

In a further embodiment, a tangible, non-transitory, machine-readable medium, comprising machine-readable instructions configured to display an industrial plant layout on a display. The instructions are also configured to overlay the industrial plant layout onto a geographic image. Further, instructions are configured to receive one or more inputs from a plurality of remote users. In addition, the instructions are configured to manipulate the layout with respect to the geographic image based on the one or more inputs. Moreover, the instructions are configured to create an industrial plant design based on the industrial plant layout and the geographic image.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The techniques described herein provide for designing industrial plant systems by merging, for example, a variety of models to better optimize the resulting design. For example, 2D and/or 3D CAD models may be merged with models that include environmental conditions (e.g., weather models, earthquake models, geographic/geologic models, etc.), economic conditions and/or predictions, performance models (e.g., performance of power production system models, such as gas turbines, steam turbines, hydroturbines, wind turbines, nuclear reactor, turboexpanders, etc.), plant component models, regulatory models, design constraint models, and so on, to arrive at an industrial plant design that may be more efficient and cost effective as opposed to designs that do not incorporate the techniques described herein. Further, collaborative systems are described that improve the ability of multiple designers, which may include designers from different disciplines (e.g., engineering, economics, human factors, government regulation experts, and so on), to simultaneously work from remote locales around the world. By providing for collaborative modeling and model merging of different model types, the techniques described herein may result in improved design efficiencies and a lower costs.

Figure 1:
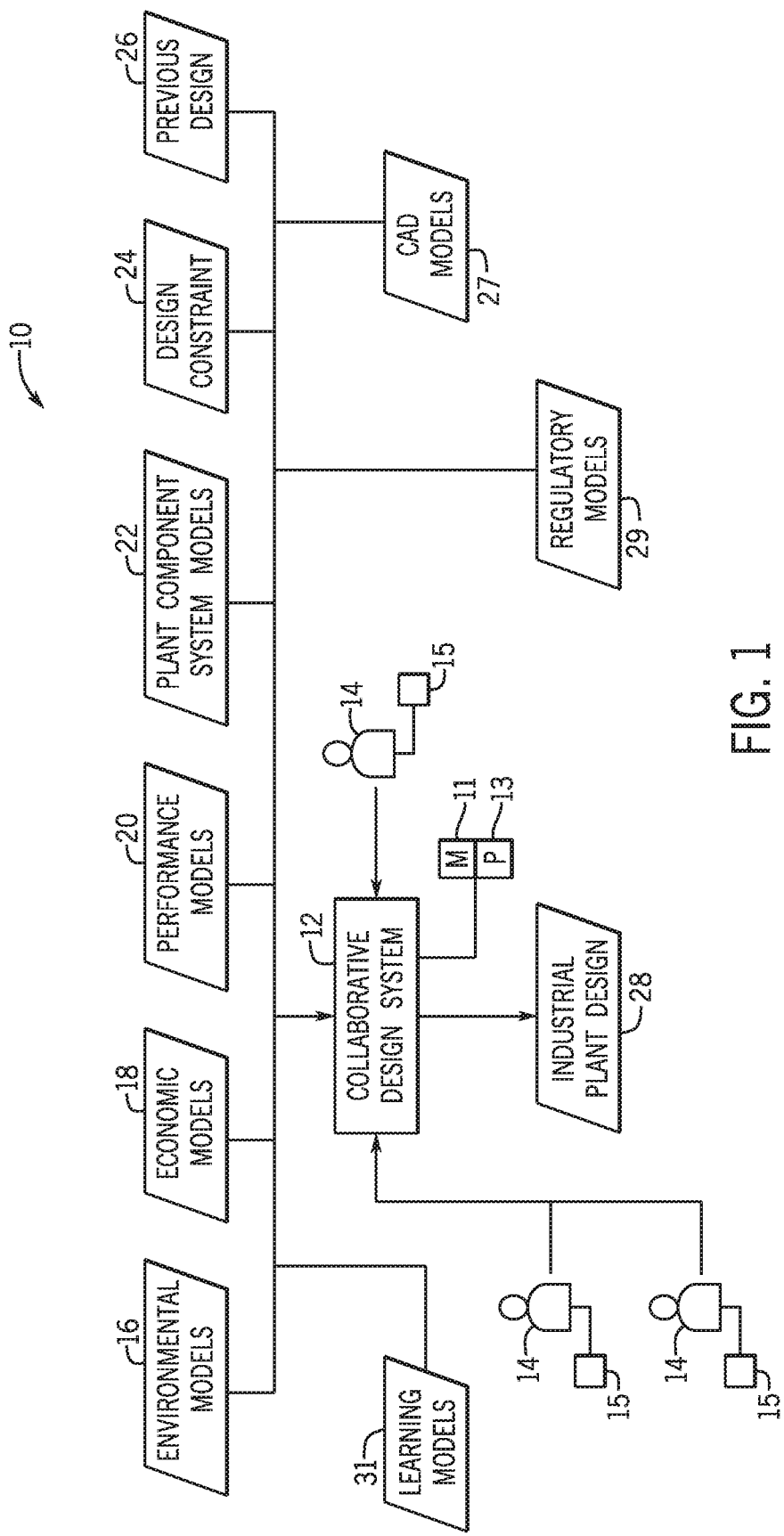
FIG. 1 is a block diagram of an embodiment of a design and modeling system.

Turning now to the drawings, FIG. 1 is a block diagram of an embodiment of a design and modeling system 10 that may be utilized in industrial plant design collaboration. The design and modeling system 10 includes a collaborative design system 12 that facilitates the generation of designs for industrial plants (e.g., combined cycle gas turbine facility, wind farm, steam turbine systems, hydroturbine systems, sewage processing plant, hydrocarbon refinery facility, manufacturing plants, chemical plants, or any combination thereof). For example, the collaborative design system 12 may enable one or more users 14 (e.g., modelers from different disciplines, modelers located in different geographic areas) to generate drawings of some or all of the components of an industrial plant to create a design of an entire industrial plant.

For example, the collaborative design system 12 may be implemented in hardware or in software, or a combination thereof. Accordingly, the collaborative design system 12 may include one or more executable programs stored in a memory 11 and executable by one or more processors 13, such as microprocessors, that may operate in conjunction with other executable programs (e.g., a computer aided design programs), or the collaborative design system 12 may operate as a stand-alone program and include various modeling systems, as further described herein. Additionally, the collaborative design system 12 may receive inputs from the multiple users 14, and/or from multiple devices to improve collaboration. For example, the collaborative design system 12 may be executed on a cloud device (e.g., a cloud-based server) and communicate with remote devices 15 (e.g., smartphones, desktop computers, virtual reality systems, augmented reality systems, servers, or any other computing device). For example, the other devices 15 may include an executable program (e.g., an application, a web-based browser, or any other system that enable the use of an executable program) that enables the users 14 to collaborate with each other via the collaborative design system 12. Further, the collaborative design system 12 may be manipulated by multiple users 14 simultaneously (e.g., in real-time) in a single session of the collaborative design system 12, such that the users 14 may manipulate the same design in a collaborative environment. For example, an input by one user 14 may be seen by the other users 14 present in the same session of the collaborative design system 12.

In the depicted embodiment, the collaborative design system 12 may include environmental models 16, economic models 18, performance models 20, a plant component or system models 22, a design constraint models 24, previous designs models 26, and/or computer aided design (CAD) models 27. Each of these models may be used as inputs into the collaborative design system 12 and/or may have been created via the collaborative design system 12. Further, each of these models may be indicative of information suitable for merging into a final plant design 28. For example, the environmental models 16 may be indicative of geographical data (e.g., including geographic information system [GIS] data), including topology, vegetation, soil, seismic activity, wind patterns, weather patterns, temperature, humidity, existing structures, coordinates, location relative to other points of interest (e.g., residential area, industrial areas, transportation hubs, or any other point of interest), location of utilities (e.g., power cables, municipal sewage systems), roads, flooding zones, hurricane zones, tornado zones, topographic maps, or any other environmental data. In certain embodiments, the environmental data may be used, for example, to additionally determine performance for the industrial plant. For example, when the plant includes a power production system, the models may be used to determine a performance (e.g., megawatts produced) based on altitude, ambient temperatures, ambient pressures, humidity, and so on.

The economic models 18 may be indicative economic costs, accounting costs, profit, return on investments, and so on, related to an industrial plant. Further, costs may including fixed costs (e.g., costs of plant components, construction of the plant, employee benefits, maintenance, depreciation, or any other fixed cost), variable costs (e.g., price of consumable products, profit margin, or any other variable cost), or any other cost related to the construction and operation of an industrial plant. Profit may include monetary profits as well as tax credits (e.g., green credits), energy market futures, resellable credits, and so on. The performance models 20 may include parameters related to the production of the industrial plant, such as power output in megawatts, efficiency measures (e.g., isentropic efficiencies, adiabatic efficiencies), stoichiometric measures, fuel use, environmental impact, or any other parameter relating to the production of the industrial plant. The performance models 20 may include performance at various international organization for standardization (ISO) conditions or ratings, such as elevation, relative humidity, ambient temperature, and so on.

The plant component or system models 22 may include a list of components or systems that may be used in the industrial plant, as well as certain information related to the component or systems, including cost, capabilities, manufacturing information, ratings (e.g., including ISO ratings), and so on. Components may include conduits (e.g., electrical, piping), pumps, valves, sensors, control systems, field devices (e.g., Fieldbus Foundation devices, Hart devices), actuators, and so on. For example, a user 14 may use the models 22 to add, remove, and/or change a component or system of the plant during design of the plant.

Further, the design constraint models 24 may include one or more constraints relating to the design of the industrial plant, such as the maximum distance between an exhaust section of a gas turbine and a heat recovery steam generator (HRSG), the minimum distance between two wind turbines, or any other design constraint relating to the design of the industrial plant. For example, the design constraint input 24 may include a table of the design constraints. Further, if one of the users 14 makes a change in the collaborative design system 12 that infringes one of the design constraint inputs 24, the collaborative design system 12 may display a message (e.g., error message) indicative of an infringement of one of the design constraint inputs 24. Further, the collaborative design system 12 may also display a message indicative of which design constraint in the models 24 has been infringed. Computer aided design (CAD) models 27 may include information such as 2D/3D component/system information, solid/surface modeling, parametric models, wireframe models, vector models, non-uniform rational basis spline (NURBS) models, geometric models, and the like, describing components/systems of the plant, geometries and structures. The CAD models 27 may also include geometric dimensions, tolerances, text (e.g., annotations, notes), other dimensions, material type, material specifications, finishes (e.g., surface finishes), clearances, and so on, associated with the plant.

Regulatory models 29 may include lists of government regulations, emissions models that simulate emissions for components/systems of the plant (e.g., NOx emissions, $CO_2$ emissions, particulate counts, fluid emissions (e.g., wastewater), and so on). The regulatory models 29 may also include costs for fines, time for inspection/approval of plant designs at various jurisdictions, inspection schedules, and the like.

Further, the previous design models 26 may include designs that have been previously created. For example, the collaborative design system 12 may include a machine learning process that enables the collaborative design system 12 to "learn" from industrial plant designs previously created. For example, preferred placement of components/systems, routing of conduits, number of power production systems (e.g., gas turbines, wind turbines, hydroturbines, steam turbines, and so on), interconnection between systems, layouts, compass orientations based on environmental models (e.g., based on wind models, weather models), and/or based on any of the models 16, 18, 20, 22, 24, 26, 27, 29 described herein. To "learn", machine learning models 31 may be created and used by the collaborative design system 12. The machine learning models 31 may include expert systems (e.g. forward chained expert systems, backward chained expert systems), neural networks, fuzzy logic systems, state vector machines (SVMs), inductive reasoning systems, Bayesian inference systems, or a combination thereof.

The previous design input 26 may include one or more previous industrial plant designs that performed well or as desired, and/or the previous design input 26 may include one or more previous industrial plant designs that include features to be avoided. Further, the machine learning process (e.g., using the models 31) may utilize the previous design input 26 in conjunction with the design constraint input 24 to automatically create an industrial plant design. The collaborative design system 12 may thus generate an industrial plant design output 28, which is indicative of an industrial plant design. Further, the industrial plant design output 28 may be utilized as the previous design input 26 in later sessions of the collaborative design system 12.

Figure 2:
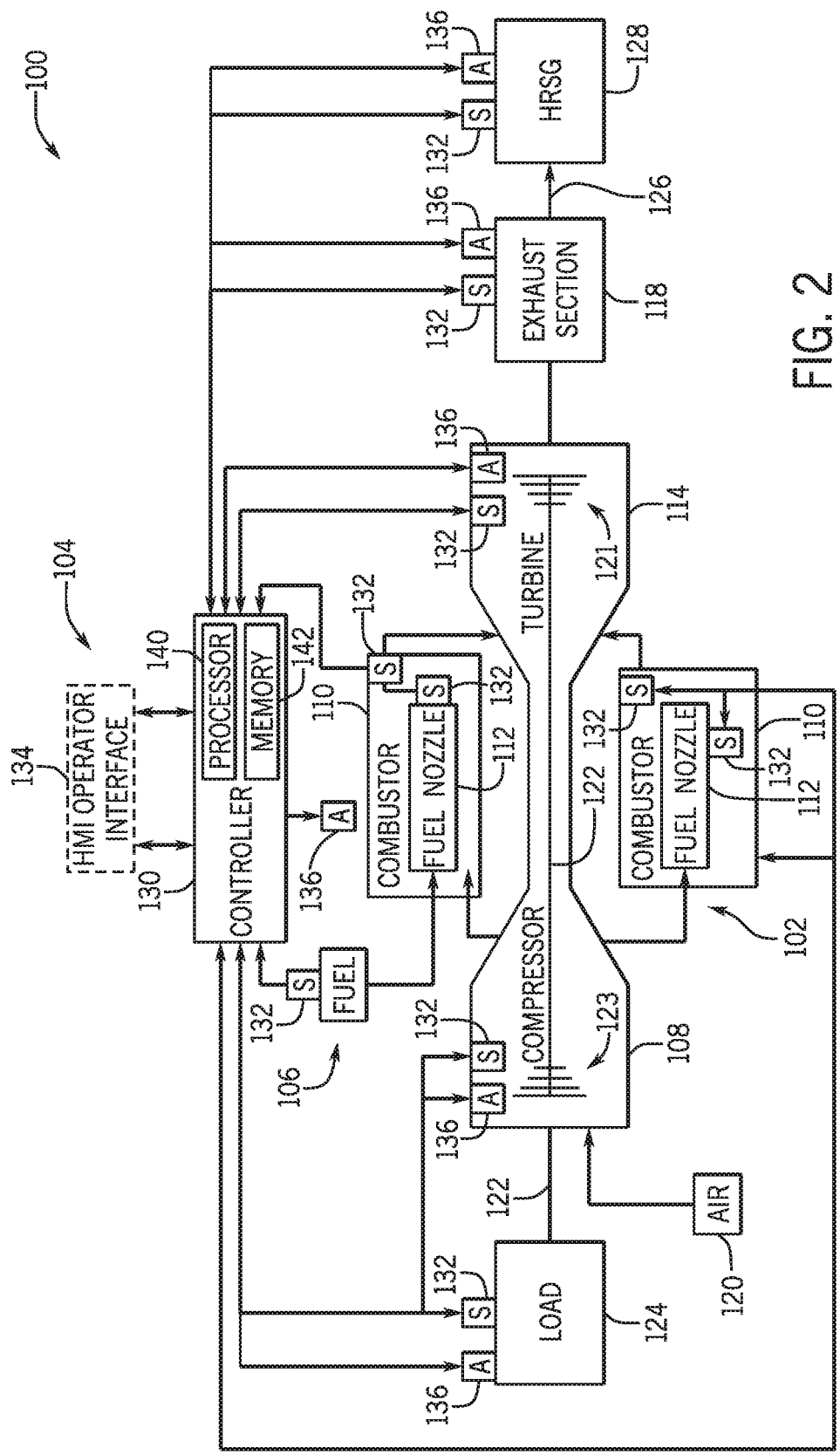
FIG. 2 is block diagram of an embodiment, of an industrial plant that may be conceived, designed, and/or engineered, by the design and modeling system of FIG. 1.

It may be beneficial to describe an industrial plant that could be designed by the design and modeling system 10 of FIG. 1. Accordingly, FIG. 2 illustrates an example of a power production plant system 100 that may be entirely (or partially) conceived, designed, and/or engineered by the design and modeling system 10. As illustrated in FIG. 2, the power production plant system 100 includes a gas turbine system 102, a monitoring and design and modeling system 104, and a fuel supply system 106. The gas turbine system 102 may include a compressor 108, combustion systems 110, fuel nozzles 112, a gas turbine 114, and an exhaust section 118. During operation, the gas turbine system 102 may pull air 120 into the compressor 108, which may then compress the air 120 and move the air 120 to the combustion system 110 (e.g., which may include a number of combustors). In the combustion system 110, the fuel nozzle 112 (or a number of fuel nozzles 112) may inject fuel that mixes with the compressed air 120 to create, for example, an air-fuel mixture.

The air-fuel mixture may combust in the combustion system 110 to generate hot combustion gases, which flow downstream into the turbine 114 to drive one or more turbine stages. For example, the combustion gases may move through the turbine 114 to drive one or more stages of turbine blades 144, which may in turn drive rotation of a shaft 122. The shaft 122 may connect to a load 124, such as a generator that uses the torque of the shaft 122 to produce electricity. After passing through the turbine 114, the hot combustion gases may vent as exhaust gases 126 into the environment by way of the exhaust section 118. The exhaust gas 126 may include gases such as carbon dioxide ($CO_2$), carbon monoxide (CO), nitrogen oxides ($NO_x$), and so forth.

The exhaust gas 126 may include thermal energy, and the thermal energy may be recovered by a heat recovery steam generation (HRSG) system 128. In combined cycle systems, such as the power plant 100, hot exhaust 126 may flow from the gas turbine 114 and pass to the HRSG 128, where it may be used to generate high-pressure, high-temperature steam. The steam produced by the HRSG 128 may then be passed through a steam turbine engine for further power generation. In addition, the produced steam may also be supplied to any other processes where steam may be used, such as to a gasifier used to combust the fuel to produce the untreated syngas. The gas turbine engine generation cycle is often referred to as the "topping cycle," whereas the steam turbine engine generation cycle is often referred to as the "bottoming cycle." Combining these two cycles may lead to greater efficiencies in both cycles. In particular, exhaust heat from the topping cycle may be captured and used to generate steam for use in the bottoming cycle.

In certain embodiments, the system 100 may also include a controller 130. The controller 130 may be communicatively coupled to a number of sensors 132, a human machine interface (HMI) operator interface 134, and one or more actuators 136 suitable for controlling components of the system 100. The actuators 136 may include valves, switches, positioners, pumps, and the like, suitable for controlling the various components of the system 100. The controller 130 may receive data from the sensors 132, and may be used to control the compressor 108, the combustors 110, the turbine 114, the exhaust section 118, the load 124, the HRSG 128, and so forth.

In certain embodiments, the HMI operator interface 134 may be executable by one or more computer systems of the system 100. A plant operator may interface with the industrial system 10 via the HMI operator interface 44. Accordingly, the HMI operator interface 134 may include various input and output devices (e.g., mouse, keyboard, monitor, touch screen, or other suitable input and/or output device) such that the plant operator may provide commands (e.g., control and/or operational commands) to the controller 130.

The controller 130 may include a processor(s) 140 (e.g., a microprocessor(s)) that may execute software programs to perform the disclosed techniques. Moreover, the processor 140 may include multiple microprocessors, one or more "general-purpose" microprocessors, one or more special-purpose microprocessors, and/or one or more application specific integrated circuits (ASICS), or some combination thereof. For example, the processor 39 may include one or more reduced instruction set (RISC) processors. The controller 130 may include a memory device 142 that may store information such as control software, look up tables, configuration data, etc. The memory device 142 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

Further, as discussed above, the design and modeling system 10 may include further data about the plant design shown in FIG. 2. For example, the design and modeling system 10 may include the economic features related to the design, the performance of the design, and/or whether the design complies with the design constraints, regulatory compliance, performance, CAD features, list of components/systems (e.g., bill of material [BOM]), and so on. Further, the design and modeling system 10 may include geographical information relating to the location of each of the components/systems.

Figure 3:
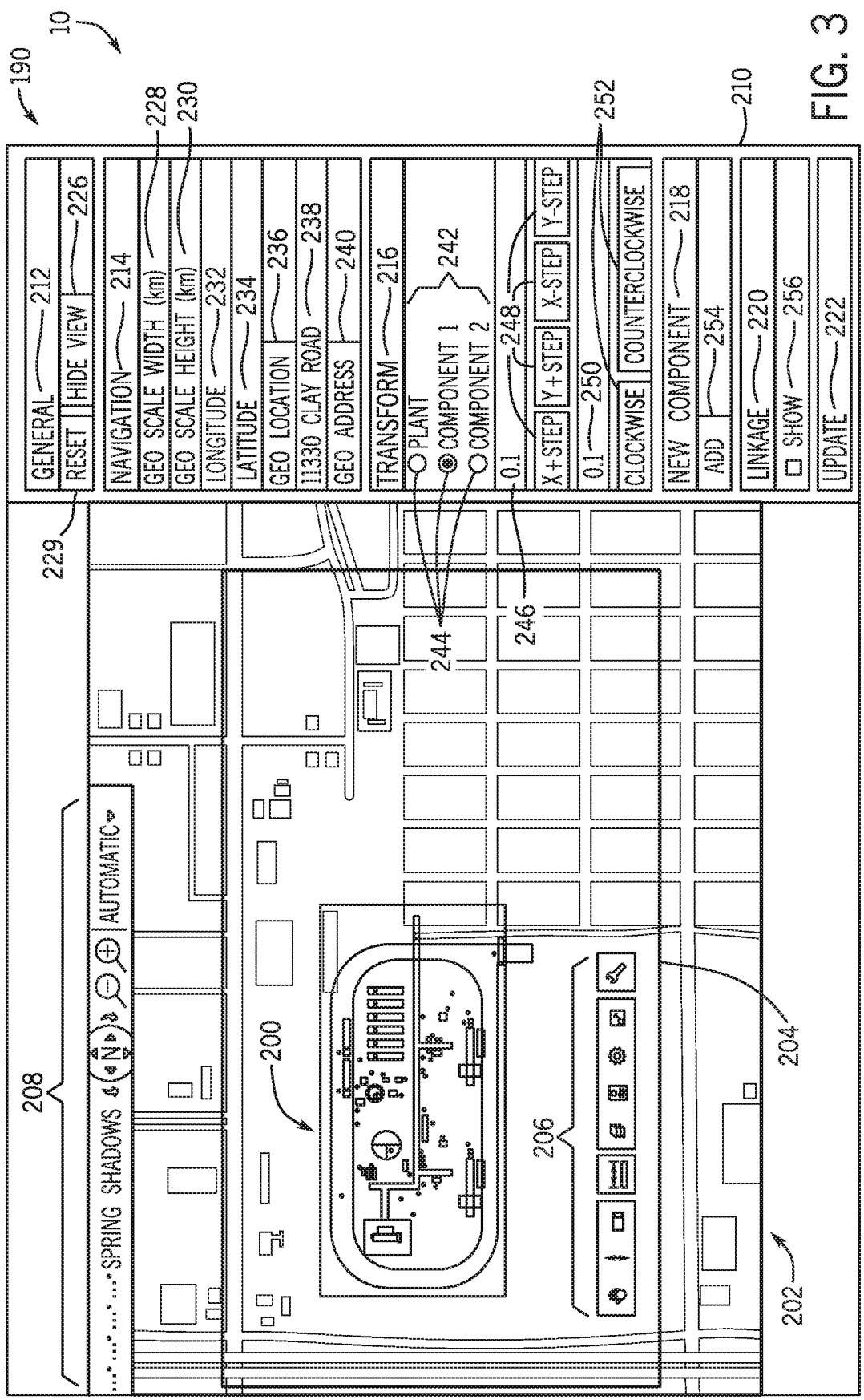
FIG. 3 illustrates an embodiment of a graphical user interface (GUI) of the design and modeling system of FIG. 1 displaying an industrial plant design overlaid onto a satellite image of a physical location.

Turning now to FIG. 3, the figure illustrates an embodiment of a graphical user interface (GUI) 190 that may be included as part of the design and modeling system 10. In the depicted embodiment, the GUI 190 is shown as displaying an industrial plant design 200 overlaid onto a map 202 (e.g., satellite map) of a physical location. In some embodiments, the industrial plant design 200 may be overlaid onto any suitable image, including an image of wind speeds, seismic activity, a topographical map, or any other image indicative of geographic information.

Further, in the present embodiment, the design and modeling system 10 includes a box 204 shown in outline form indicative of the area that may be manipulated, as opposed to map areas that may not be manipulated. The size and shape of the box 204 may be changed to any suitable size or shape. For example, if a user 14 is designing a larger industrial plant, the user may increase the size of the box 204 to enable manipulation over a larger area. Further, included in the box 204 is a control panel 206, which includes certain controls for manipulating the industrial plant design 200 via GUI techniques (e.g., touch gestures, mouse input, keyboard input, voice input). For example, the control panel 206 may enable adding or removing components, changing the location or orientation of components, increasing or decreasing the size of components, manipulating the view of the industrial plant design 200, opening a settings tab, or any other suitable controls for manipulating the industrial plant design 200.

Further, the design and modeling system 10 may include a control panel 208 that enable the manipulation of the underlying satellite image 202. For example, the control panel 208 may enable the rotation, zooming in or out, changing the location displayed, or any other suitable control for manipulating the underlying satellite image 202. Further, in embodiments that include different types of underlying images, different controls may be utilized in the control panel 208.

In the present embodiment, the design and modeling system 10 also includes a side control panel 210 that enables further manipulation of the industrial plant design 200 and/or the underlying satellite image 202. In the present embodiment, the side control panel 210 includes a general section 212, a navigation section 214, a transform section 216, a new component section 218, a linkage section 220, and an update section 222. The general section 212 includes a "Reset" option 224 that enables a user to clear the industrial plant design 200 to the beginning of the session. The general section 212 further includes a "Hide View" option 226 that enables a user to hide the industrial plant design 200 or the underlying satellite image 202 from view to increase the visibility of certain features.

The navigation section 214 enables further manipulation of the underlying satellite image 202. For example, a width option 228 and a height option 230 enable a user to select a width and height of the underlying satellite image 202. Further, the longitude option 232 and the latitude option 234 enable the user to select the longitude and latitude of the center of the satellite image 202. For example, after a user has input selections into the width option 228, the height option 230, the longitude option 232, and/or the latitude option 234, the user may select a "GEO Location" option 236. Upon selecting the "GEO Location" option 236, the underlying satellite image 202 may change to correspond to the size and location selected by the user. In some embodiments, an address may be utilized instead of a coordinate location. For example, the navigation section 214 includes an address option 238 in which a user may input an address. After inputting an address, the user may select a "GEO address" option 240, which may cause the underlying satellite image 202 to be centered on the specified address in the address option 238.

The transform section 216 may enable manipulation of one or more components of the industrial plant displayed in the industrial plant design 200. For example, the transform section 216 includes a part list 242, and each part in the part list 242 includes a corresponding selectable option 244. In the present embodiment, the selectable option 244 corresponding to Component 1 has been selected, which enable further manipulation of the Component 1. For example, a user may enter a numerical value into a translation option 246, and may select the translation direction by selecting one of a direction of translation options 248, which correspond to positive and negative direction along the x and y axes. In the present embodiment, a user has entered 0.1 as the input in the translation option 246, which may correspond to any unit of distance, including a meter, kilometer, foot, yard, mile, or any other unit of distance. Further, the unit of distance may be changed from one unit of distance to any other unit of distance. In the present embodiment, the underlying satellite image 202 is two-dimensional. In some embodiments, the underlying image may include more or less dimensions, including 1, 3, 4, or more. Embodiments that include a different number of dimensions may include additional translation options to translate the components in the other dimensions.

Further, the transform section includes a rotation option 250 and direction of rotation options 252. For example, a user may enter a numerical value into the rotation option 250, and may select the rotation direction by selecting one of the direction of rotation options 248, which correspond to clockwise and counterclockwise directions with respect to an axis coming out of the page. In the present embodiment, a user has entered 0.1 as the input in the rotation option 246, which may correspond to any unit of rotation, including a degree, radian, or any other unit of rotation. Further, the unit of rotation may be changed from one unit of rotation to any other unit of rotation. In the present embodiment, the underlying satellite image 202 is two-dimensional. In some embodiments, the underlying image may include three dimensions, and the direction of rotation options 248 may include the third dimension.

The new component section 218 includes an add option 254 that enables a user to add a new component to the industrial plant design 200. For example, when a user selects the add option 254, a dialogue box may appear that may display a file directory of selectable components. The user may navigate the dialogue box to select a component. After selecting a component, the selected component may appear in the industrial plant design 200, where the selected component may be manipulated.

The linkage section 220 includes a selectable show option 256. When the selectable show option 256 is selected, the linkages between each component may be displayed on the industrial plant design 200. The update section 222 enables a user to update the session of the design and modeling system 10 for any other users participating in the session. For example, if a user has made one or more changes, the user may enable other users in the session to view those changes by utilizing the update section 222.

Just as the map 202 may be used as an overlay, other maps, including dynamic maps, may be used. For example, weather "maps" showing wind conditions (e.g., historical and/or current wind direction, speed, and so on), rain conditions, flood-prone areas (e.g., FEMA maps), earthquake maps, and so on. Indeed, the GUI 190 may be used to show topology, vegetation, soil, seismic activity, wind patterns, weather patterns, temperature, humidity, existing structures, coordinates, location relative to other points of interest (e.g., residential area, industrial areas, transportation hubs, or any other point of interest), location of utilities (e.g., power cables, municipal sewage systems), roads, flooding zones, hurricane zones, tornado zones, topographic maps, and the like.

The series of 2D drawings and 3D models CAD models 27 may be created and then loaded onto the GUI 190 based on the results from product configuration which may consider optimization of performance, economics, regulatory compliance, environmental factors, and so on, via models 16, 18, 20, 22, 24, 26, 29. The collaborative design system 12 may provide a configuration function to enable a user to enter certain configuration information based on specifications, which may be entered by the users 14. For example, specifications may include power production in megawatts, reliability measures, type of fuel to use, environmental conditions to be encountered during operations (e.g., ambient temperature, pressures, elevation). The collaborative design system 12 may then execute the GUI 190 to display a 2D drawing or 3D CAD model 207 corresponding to the selected configuration overlaid onto a map view. Any collaborator or user 14 can choose a location on the map to place the plant model online, including translation and rotation of the plant.

The boundary of the plant location can be defined on the map per GPS coordinates or per plot drawing overlaying on the map 202. The user 14 can then drag/change the location of the equipment inside the plant through translation, rotation or scaling. These operation would be regulated by the design constraints/rules 24. If any rule was infringed during the movement, the collaborative design system 12 will provide a warning and would stop a user 14 from doing so. These constraint rules 24 may be managed by a super user role included in the collaborative design system 12, and may be entered through batch uploading or dynamic adjustment to the rules using a user interface. The rules' approval may be done through workflows managed by the collaborative design system 12, which may include engineering review workflows.

In certain embodiments. after the plant layout is placed at a desired location, the geo-coordinates and map would be associated and saved into 2D and 3D CAD models 27, that include plant systems/components and the various maps. Both 2D and 3D CAD models 27 may be updated automatically per the layout changes on the map 202 via the GUI 190, which may occur on line. The collaborative design system 12 allows user to measure the distance and area of the plant and/or maps online. The collaborative design system 12 may also provide a delta difference on equipment quantity/balance of plant between the final layout and the initial reference layout. The change of the layout may be saved by the collaborative design system 12, and allow users 14 to view or edit changes at a later time. Multiple layout options may be saved for scenario analysis as described in further detail below. Standard configuration layers may be toggled on and off to enable the quick configuration choices. The collaborative design system 12 may use machine learning/artificial intelligence, for example via models 31, to automatically optimize the plant layout and performance to improve optimization of the entire process of configuring, costing, performance and layout of a power plant 12. The collaborative design system 12 may directly print out 3D prototype models (e.g., via 3D printers) and provide 3D immersive visualization (e.g., via VR/AR) for users 14 to visualize and collaborate on the plant design 28.

Figure 4:
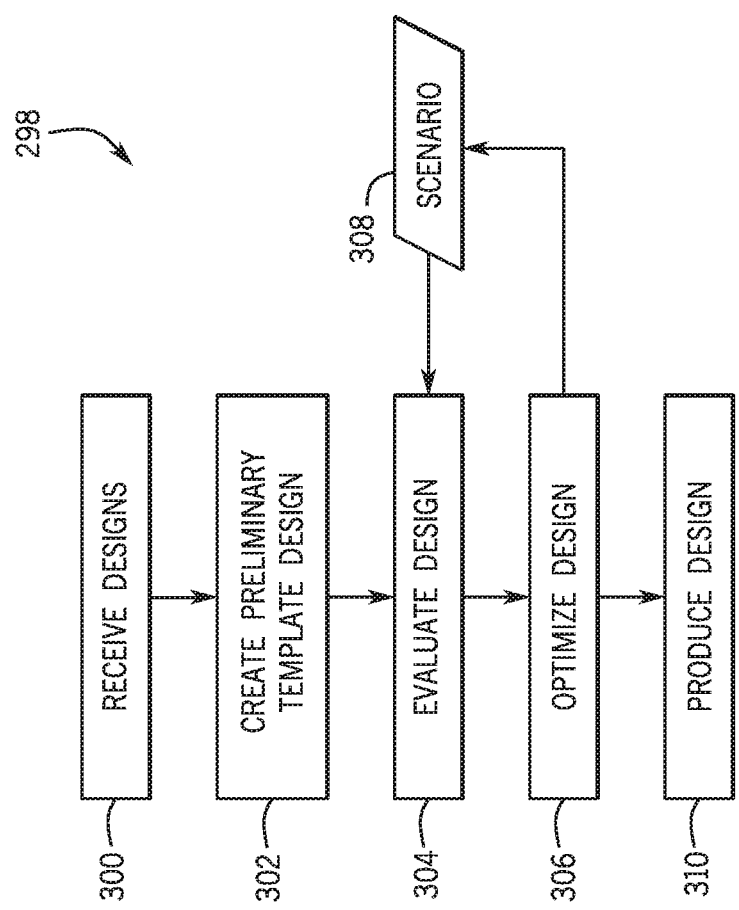
FIG. 4 is a flow chart illustrating an embodiment of a process for the design and modeling system of FIG. 1 to automatically generate industrial plant designs.

FIG. 4 is a flow chart illustrating an embodiment of a process 298 for the collaborative design system 12 to automatically generate or to aid in the generation of industrial plant designs, such as designs 28. Although the following process 298 describes a number of operations that may be performed, it should be noted that the process 298 may be performed in a variety of suitable manners, using some or all of the operations of the process 298.

The collaborative design system 12 may receive or retrieve (block 300) previous designs 28 and/or models 16, 18, 20, 22, 24, 26, 27, 29. As discussed above, the previous designs may include designs indicative of desirable design features, and/or the previous designs may include undesirable design features that should not be included in future designs.

Then, the collaborative design system 12 may create (block 302) a preliminary template design based on the received designs and/or models 16, 18, 20, 22, 24, 26, 27, 29. In some embodiments, the preliminary template design may be the same as, or a combination of the received designs. Further, the preliminary template design may be utilized by a user as a starting point in creating an industrial plant design.

Next, the collaborative design system 12 may evaluate (block 304) the preliminary template design. The evaluation may be based on a number of factors, including cost, performance, environmental impact, or any other suitable factor in evaluating an industrial plant design. Further, the evaluation may give more weight to certain factors over other factors. Further, the control system may receive a scenario input 308 when evaluating the preliminary template design. The scenario input 308 may relate to any possibly scenario, including a price increase in consumable products, a weather event (e.g., tornado, hurricane, or other event), or any other scenario. Then, the control system may account for the scenario in the scenario input 308 when evaluating (block 304) the preliminary template design.

Then, the collaborative design system 12 may improve or otherwise optimize (block 306) the preliminary template design based on the evaluation. For example, after evaluating (block 304) the preliminary template design, the collaborative design system 12 may determine that certain factors of the preliminary template design may be improved. For example, the collaborative design system 12 may determine that making a change in the preliminary template design may decrease the cost without negatively affecting other factors. Further, when improving the design, the collaborative design system 12 may make changes that conform to the input design constraints 24. Further, the improved design may be evaluated (block 304) again in light of the scenario input 308. The process of evaluating (block 304) and improving (block 306) may be repeated until the collaborative design system 12 determines that any further changes would not further improve the design.

Then, after improving (block 306) the design, the collaborative design system 12 may produce (block 310) an industrial plant design, such as the design 28. The produced industrial plant design may be output to the users 14, which may enable the users 14 to review the produced industrial plant design for any issues which may have been overlooked by the collaborative design system 12.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a collaborative design system comprising a processor, the processor configured to:
display an industrial plant layout on a display;
overlay the industrial plant layout onto a geographic image;
receive one or more inputs from a plurality of remote users, wherein the one or more inputs comprise graphical user interface (GUI) inputs;
manipulate the industrial plant layout with respect to the geographic image based on the one or more inputs;
show the manipulation of the industrial plant layout to the plurality of remote users as a user of the plurality of remote users manipulates the industrial plant layout via a GUI input;
execute a constraint model to derive if a design constraint has been infringed based on the industrial plant layout manipulation, wherein the design constraint comprises a distance between a gas turbine system component and a steam turbine system component; and
create an industrial plant design based on the industrial plant layout and the geographic image.

2. The system of claim 1, wherein the geographic image comprises a satellite image of a geographic area, and wherein the geographic area comprise a future location for the industrial plant.

3. The system of claim 1, wherein the processor is configured to manipulate the layout with respect to the geographic image by providing for multiple users to log into a collaborative session to jointly manipulate the layout and to jointly visualize the manipulation.

4. The system of claim 1, wherein the processor is configured to manipulate the layout with respect to the geographic image by moving the industrial plant layout, a component of the plant layout, or a combination thereof, with respect to the geographic image.

5. The system of claim 1, wherein the gas turbine system component comprises an exhaust section of a gas turbine engine and wherein the steam turbine system component comprises a heat recovery steam generator component.

6. The system of claim 5, wherein the design constraint comprises a distance between two components of the industrial plant.

7. The system of claim 1, wherein the processor is configured to execute an environmental model to derive an environmental factor based on a location of the geographic image.

8. The system of claim 7, wherein the processor is configured to apply the environmental factor to derive a performance for the industrial plant.

9. The system of claim 1, wherein the processor is configured to execute a performance model, a plant component system model, a regulatory model, or a combination thereof, to derive on or more model factors, and to apply the model factors to create the industrial plant design.

10. The system of claim 1, wherein the industrial plant comprises a power production plant having a turbine system configured to provide power.

11. A method, comprising:
displaying, via a processor, an industrial plant layout on a display;
overlaying, via the processor, the industrial plant layout onto a geographic image;
receiving, via the processor, one or more inputs from a plurality of remote users, wherein the one or more inputs comprise graphical user interface (GUI) inputs;
manipulating, via the processor, the industrial plant layout with respect to the geographic image based on the one or more inputs;
showing the manipulation of the industrial plant layout to the plurality of remote users as a user of the plurality of remote users manipulates the industrial plant layout via a GUI input;
executing a constraint model to derive if a design constraint has been infringed based on the industrial plant layout manipulation, wherein the design constraint comprises a distance between a gas turbine system component and a steam turbine system component; and
creating, via the processor, an industrial plant design based on the industrial plant layout and the geographic image.

12. The method of claim 11, wherein the manipulating, via the processor, the layout with respect to the geographic image comprises providing, via the processor, for multiple users to log into a collaborative session to jointly manipulate the layout and to jointly visualize the manipulation.

13. The method of claim 11, wherein gas turbine system component comprises an exhaust section of a gas turbine engine and wherein the steam turbine system component comprises a heat recovery steam generator component.

14. The method of claim 11, comprising, executing, via the processor, environmental model to derive an environmental factor based on a location of the geographic image, and applying the environmental factor to derive a performance for the industrial plant.

15. The method of claim 11, comprising, executing, via the processor, a performance model, a plant component system model, a regulatory model, or a combination thereof, to derive on or more model factors, and to apply the model factors for creating the industrial plant design.

16. A tangible, non-transitory, machine-readable medium, comprising machine-readable instructions configured to:
display an industrial plant layout on a display;
overlay the industrial plant layout onto a geographic image;
receive one or more inputs from a plurality of remote users, wherein the one or more inputs comprise graphical user interface (GUI) inputs;
manipulate the industrial plant layout with respect to the geographic image based on the one or more inputs;
show the manipulation of the industrial plant layout to the plurality of remote users as a user of the plurality of remote users manipulates the industrial plant layout via a GUI input;
execute a constraint model to derive if a design constraint has been infringed based on the industrial plant layout manipulation, wherein the design constraint comprises a distance between a gas turbine system component and a steam turbine system component; and create an industrial plant design based on the industrial plant layout and the geographic image.

17. The tangible, non-transitory, machine-readable medium of claim 16, wherein the instructions are configured to manipulate the layout with respect to the geographic image by providing for multiple users to log into a collaborative session to jointly manipulate the layout and to jointly visualize the manipulation.

18. The tangible, non-transitory, machine-readable medium of claim 16, wherein the gas turbine system component comprises an exhaust section of a gas turbine engine and wherein the steam turbine system component comprises a heat recovery steam generator component.

19. The tangible, non-transitory, machine-readable medium of claim 16, wherein the instructions are configured to execute an environmental model to derive an environmental factor based on a location of the geographic image.

20. The tangible, non-transitory, machine-readable medium of claim 16, wherein the instructions are configured to execute a performance model, a plant component system model, a regulatory model, or a combination thereof, to derive on or more model factors, and to apply the model factors to create the industrial plant design.

* * * * *